(12) United States Patent
Hong et al.

(10) Patent No.: US 10,838,537 B2
(45) Date of Patent: Nov. 17, 2020

(54) ENVIRONMENTAL SENSOR INTEGRATED IN AN ELECTRONIC DISPLAY DEVICE

(71) Applicant: Samsung Display Co., Ltd., Yongin-si (KR)

(72) Inventors: Won-Ki Hong, Suwon-si (KR); Jong-Seo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 835 days.

(21) Appl. No.: 15/431,336

(22) Filed: Feb. 13, 2017

(65) Prior Publication Data

US 2017/0277342 A1 Sep. 28, 2017

(30) Foreign Application Priority Data

Mar. 22, 2016 (KR) .......................... 10-2016-0033809

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

| | | |
|---|---|---|
| 2013/0211207 A1 | 8/2013 | Joseph et al. |
| 2014/0015769 A1* | 1/2014 | Lee .......................... H01H 9/04 345/173 |
| 2014/0112510 A1 | 4/2014 | Yang et al. |
| 2014/0340216 A1 | 11/2014 | Puskarich |
| 2015/0020577 A1* | 1/2015 | Luebke .................. G01N 27/12 73/31.06 |

(Continued)

FOREIGN PATENT DOCUMENTS

| | | |
|---|---|---|
| KR | 10-2007-0088921 | 8/2007 |
| KR | 10-20110100807 | 9/2011 |

OTHER PUBLICATIONS

Thomas H. Bointon, et al., "High Quality Monolayer Graphene Synthesized by Resistive Heating Cold Wall Chemical Vapor Deposition", www.MaterialsViews.com, Advanced Materials, www.advmat.de, wileyonlinelibrary.com, Adv. Mater. 2015, vol. 27, pp. 4200-4206.

*Primary Examiner* — Matthew D Krcha
(74) *Attorney, Agent, or Firm* — H.C. Park & Associates, PLC

(57) ABSTRACT

An environmental sensor for an electronic device includes a substrate, a first sensing unit having a first sensor electrode disposed on the substrate, a second sensing unit having a second sensor electrode disposed on the substrate, an insulating layer covering the first sensor electrode, and a cover that is disposed over the first and second sensor electrodes, the cover including at least one hole through which chemical particles pass. The first and second sensing units each sense one of a capacitance-change due to the chemical particles that pass through the hole and then adhere to the insulating layer located on the first sensor electrode and a resistance-change due to the chemical particles that pass through the hole and then adhere to the second sensor electrode.

12 Claims, 12 Drawing Sheets

(56) References Cited

U.S. PATENT DOCUMENTS

2015/0226585 A1     8/2015   Yang
2016/0011158 A1*   1/2016   Liu .................... G01N 33/0027
                                                                        73/31.06

* cited by examiner

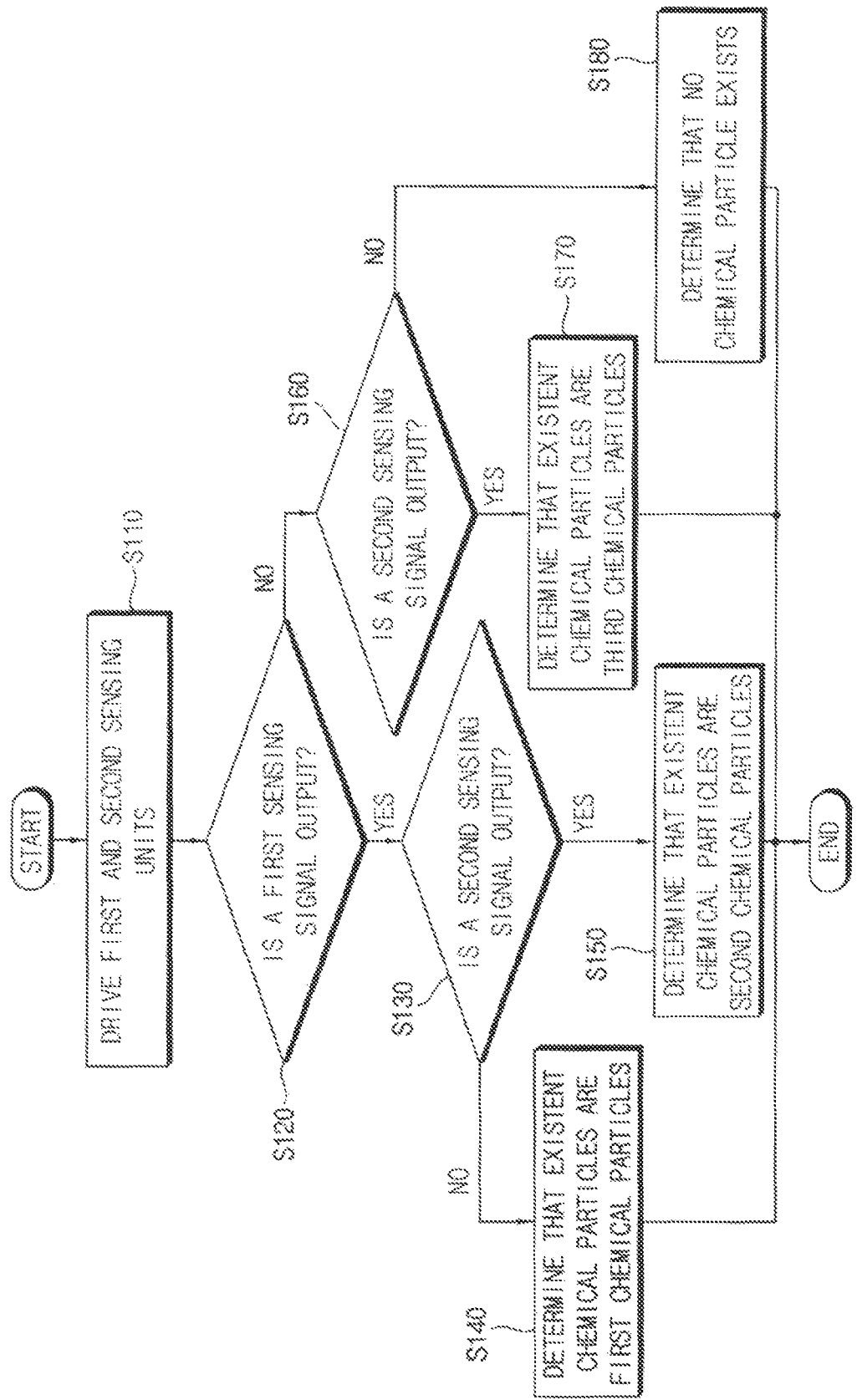

ENVIRONMENTAL SENSOR INTEGRATED IN AN ELECTRONIC DISPLAY DEVICE

CROSS-REFERENCE TO RELATED APPLICATION

This application claims priority from and the benefit of Korean Patent Application No. 10-2016-0033809, filed on Mar. 22, 2016, which is hereby incorporated by reference for all purposes as if fully set forth herein.

BACKGROUND

Field

The invention relates generally to electronic devices, and, more particularly, to electronic display devices having an environmental sensor integrated therewith.

Discussion of the Background

An electronic display device (e.g., a smart phone, a smart pad, a smart watch, etc) includes various sensors (e.g., a touch-screen sensor, an acceleration sensor, a gyro sensor, a motion sensor, etc.) according to various trends and convergence of mobile technologies. Recently, since environmental pollution (e.g., smog, fine dust, etc.) is getting worse, many manufacturers desire to install an environmental sensor (referred to as a chemical sensor, a gas sensor, a smell sensor, and so on) in the electronic device in order to allow a user to measure environmental pollution therewith. However, where the electronic device includes the environmental sensor, the electronic device gets bigger. Thus, manufacturers who include an environmental sensor in the electronic device consider a trade-off (inverse relationship) between the size of the electronic device and the sensing performance of the environmental sensor included in the electronic device. In other words, a conventional electronic device may place a greater emphasis on minimizing the size of the device by including an environmental sensor having low substance resolution (meaning the environmental sensor cannot identify certain types of chemical particles, for example) or may focus on the increasing the sensing performance by including a plurality of environmental sensors each sensing respective types of chemical particles. But, such a conventional electronic device has limits in the size and the sensing performance to include the environmental sensor in the foregoing manner.

The above information disclosed in this Background section is only for enhancement of understanding of the background of the inventive concepts, and, therefore, it may contain information that does not form the prior art that is already known in this country to a person of ordinary skill in the art.

SUMMARY

Electronic display devices constructed according to the principles of the invention include an integrated environmental sensor having high sensing performance (i.e., high substance resolution) while also being manufactured to have a small size. In particular, the integrated environmental sensor may have high sensing performance (i.e., high substance resolution) while being manufactured to have a small size compatible with portable devices such as mobile phones and the like. The environmental sensor may include two different types of environmental sensor electrodes that have different sensing characteristics. For example, a first environmental sensor electrode may react to first and second types of chemical particles, but not to a third type of chemical particle and a second environmental sensing electrode may react to the second and third types of chemical particles but not to the first type of chemical particle. In such an embodiment, the presence of each of the first, second and third types of chemical particles in the air can be made based by evaluating only whether the sensing signal is output from the first sensor electrode in combination with whether the sensing signal is output from the second sensor electrode.

Additional aspects will be set forth in the detailed description which follows, and, in part, will be apparent from the disclosure, or may be learned by practice of the inventive concepts.

According to a first aspect of the invention, an environmental sensor for an electronic display may include a substrate, a first sensing unit having a first sensor electrode disposed on the substrate, a second sensing unit having a second sensor electrode disposed on the substrate, an insulating layer covering the first sensor electrode, and a cover disposed over the first and second sensor electrodes, where the cover includes at least one hole through which chemical particles can pass. The first sensing unit may sense a capacitance-change due to the chemical particles that pass through the at least one hole and adhere to the insulating layer, and the second sensing unit may sense a resistance-change due to the chemical particles that pass through the at least one hole and adhere to the second sensor electrode.

In example embodiments, an electronic display device may have an integrated environmental sensor and a touch sensor electrode, the substrate may be a display panel substrate included in the display device, and the touch sensor electrode, the first sensor electrode, and the second sensor electrode may be formed together on the display panel substrate.

In example embodiments, an area of the first sensor electrode and an area of the second sensor electrode may be smaller than an area of the touch sensor electrode.

In example embodiments, the environmental sensor may further include a sidewall located between the touch sensor electrode and the first and second sensor electrodes and configured to prevent the chemical particles from entering a region in which the touch sensor electrode is located.

In example embodiments, the first sensing unit may output a first sensing signal when sensing the capacitance-change, the second sensing unit may output a second sensing signal when sensing the resistance-change, and different types of the chemical particles may be identified according to whether the first sensing signal is output from the first sensing unit and whether the second sensing signal is output from the second sensing unit.

In example embodiments, the first sensing unit may react to a first type of chemical particles and a second type of chemical particles, and the second sensing unit may react to the second type of chemical particles and a third type of chemical particles.

In example embodiments, the chemical particles may be determined as the first type of chemical particles when only the first sensing signal is output, the chemical particles may be determined as the third type of chemical particles when only the second sensing signal is output, the chemical particles may be determined as the second type of chemical particles when the first sensing signal and the second sensing signal are output, and it may be determined that the chemical particles do not exist when neither the first sensing signal nor the second sensing signal is output.

According to a second aspect of the invention, an environmental sensor for an electronic display device may include a substrate, a first sensing unit having a first sensor electrode disposed on the substrate, a second sensing unit having a second sensor electrode formed on the substrate, and a cover disposed over the first and second sensor electrodes, where the cover includes at least one hole through which chemical particles can pass. The first sensing unit may sense a first resistance-change due to the chemical particles that pass through the at least one hole and adhere to the first sensor electrode, and the second sensing unit may sense a second resistance-change due to the chemical particles that pass through the at least one hole and adhere to the second sensor electrode. In addition, the first sensor electrode and the second sensor electrode may have different resistance-change characteristics.

In example embodiments, an electronic display device may have an integrated environmental sensor and a touch sensor electrode, and the substrate may be a display panel substrate included in the display device, and the touch sensor electrode, the first sensor electrode, and the second sensor electrode may be supported by the display panel substrate.

In example embodiments, an area of the first sensor electrode and an area of the second sensor electrode may be smaller than an area of the touch sensor electrode.

In example embodiments, the electronic display device may further include a sidewall located between the touch sensor electrode and the first and second sensor electrodes and configured to prevent the chemical particles from entering a region in which the touch sensor electrode is located.

In example embodiments, the first sensing unit may output a first sensing signal when sensing the first resistance-change, the second sensing unit may output a second sensing signal when sensing the second resistance-change, and different types of the chemical particles may be identified according to whether the first sensing signal is output from the first sensing unit and whether the second sensing signal is output from the second sensing unit.

In example embodiments, the first sensing unit may react to a first type of chemical particles and a second type of chemical particles, and the second sensing unit may react to the second type of chemical particles and a third type of chemical particles.

In example embodiments, the chemical particles may be determined as the first type of chemical particles when only the first sensing signal is output, the chemical particles may be determined as the third type of chemical particles when only the second sensing signal is output, the chemical particles may be determined as the second type of chemical particles when the first sensing signal and the second sensing signal are output, and it may be determined that the chemical particles do not exist when neither the first sensing signal nor the second sensing signal is output.

According to a third aspect of the invention, an environmental sensor for an electronic display device includes a substrate, a first sensing unit having a first sensor electrode disposed on the substrate, a second sensing unit having a second sensor electrode disposed on the substrate, an insulating layer covering the first and second sensor electrodes, and a cover disposed over the first and second sensor electrodes, where the cover includes at least one hole through which chemical particles can pass. The first sensing unit may sense a first capacitance-change due to the chemical particles that pass through the at least one hole and adhere to the insulating layer adjacent the first sensor electrode, the second sensing unit may sense a second capacitance-change due to the chemical particles that pass through the at least one hole and adhere to the insulating layer adjacent the second sensor electrode. In addition, the first sensor electrode and the second sensor electrode may have different capacitance-change characteristics.

In example embodiments, an electronic display device may include an integrated environmental sensor and a touch sensor electrode, and the first sensor electrode and the second sensor electrode may be supported by the display panel substrate.

In example embodiments, an area of the first sensor electrode and an area of the second sensor electrode may be smaller than an area of the touch sensor electrode.

In example embodiments, the environmental sensor may further include a sidewall located between the touch sensor electrode and the first and second sensor electrodes and configured to prevent the chemical particles from entering a region in which the touch sensor electrode is located.

In example embodiments, the first sensing unit may output a first sensing signal when sensing the first capacitance-change, the second sensing unit may output a second sensing signal when sensing the second capacitance-change, and types of the chemical particles may be identified according to whether the first sensing signal is output from the first sensing unit and whether the second sensing signal is output from the second sensing unit.

In example embodiments, the first sensing unit may react to a first type of chemical particles and a second type of chemical particles, and the second sensing unit may react to the second type of chemical particles and a third type of chemical particles.

In example embodiments, the chemical particles may be determined as the first type of chemical particles when only the first sensing signal is output, the chemical particles may be determined as the third type of chemical particles when only the second sensing signal is output, the chemical particles may be determined as the second type of chemical particles when the first sensing signal and the second sensing signal are output, and it may be determined that the chemical particles do not exist when neither the first sensing signal nor the second sensing signal is output.

According to a fourth aspect of the invention, an electronic display device includes a display panel including a display panel substrate, a first sensing unit having a first sensor electrode disposed on the display panel substrate, a second sensing unit having a second sensor electrode disposed on the display panel substrate, a cover disposed over the first and second sensor electrodes, the cover including at least one hole through which chemical particles can pass, wherein the first sensing unit senses one of a capacitance-change or a resistance-change at a region corresponding to the first sensor electrode, and wherein the second sensing unit senses one of a capacitance-change or a resistance-change at a region corresponding to the second sensor electrode.

In example embodiments, the first sensing unit reacts to a first type of chemical particles and a second type of chemical particles, and the second sensing unit reacts to the second type of chemical particles and a third type of chemical particles.

In example embodiments, the chemical particles are determined as the first type of chemical particles when only the first sensing signal is output, the chemical particles are determined as the third type of chemical particles when only the second sensing signal is output, the chemical particles are determined as the second type of chemical particles when the first sensing signal and the second sensing signal are output, and it is determined that the chemical particles do not exist when neither the first sensing signal nor the second sensing signal is output.

In example embodiments, the display panel further includes a touch sensing unit having a touch sensor electrode disposed on the display panel substrate, and a sidewall located between the touch sensor electrode and the first and second sensor electrodes and configured to prevent the chemical particles from entering a region in which the touch sensor electrode is located.

In example embodiments, the electronic display device further includes a sensing controller configured to provide a first sensing control signal to the touch sensing unit to control the touch sensing unit and configured to provide a second sensing control signal to the first and second sensing units to control the first and second sensing units, wherein the sensing controller detects a user's touch input based on first sensing data generated by the touch sensing unit in response to the first sensing control signal and detects the chemical particles that exist in an air based on second sensing data generated by the first and second sensing units in response to the second sensing control signal.

Therefore, an environmental sensor according to example embodiments may have high sensing performance (i.e., high substance resolution) while being manufactured to have a small size, where the environmental sensor is included in an electronic device, by including a first sensor electrode and a second sensor electrode that have different sensing characteristics and by identifying types of chemical particles that exist in the air based on a first sensing signal output from a first sensing unit that the first sensor electrode constitutes and a second sensing signal output from a second sensing unit that the second sensor electrode constitutes, where the first and second sensor electrodes can be formed when a touch sensor electrode is formed.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 4 is a flowchart of a first exemplary embodiment of a method of operating the environmental sensor of FIG. 1.

DETAILED DESCRIPTION OF THE ILLUSTRATED EMBODIMENTS

Figure 1:
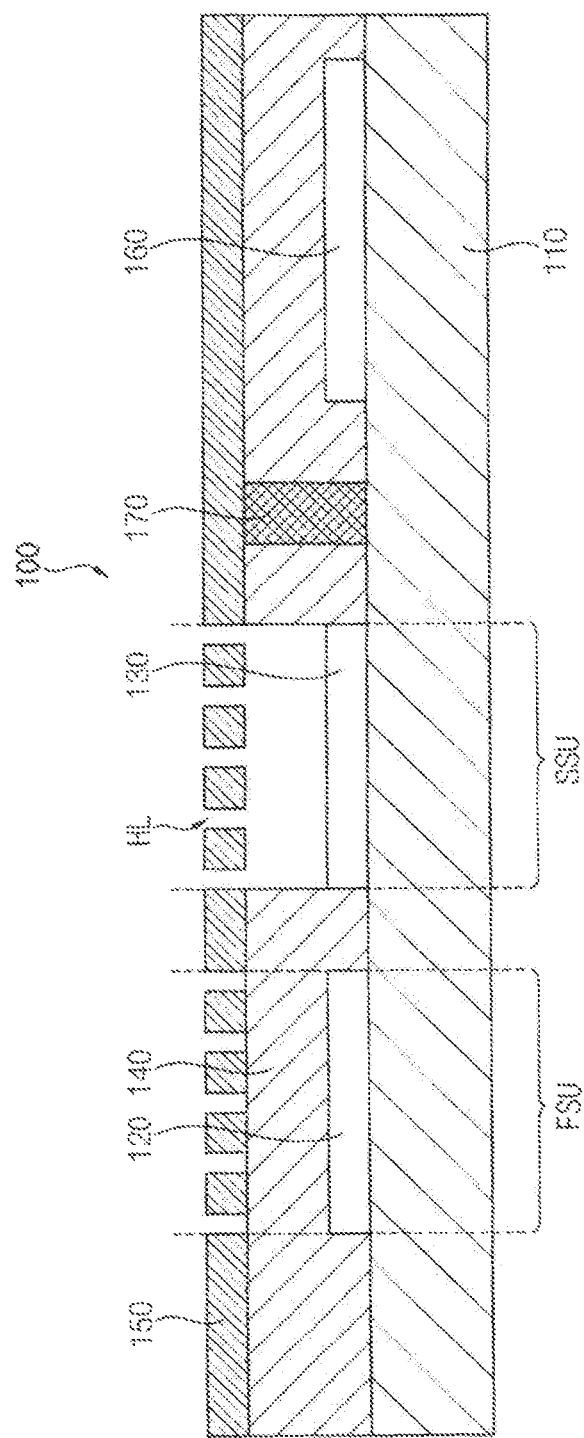
FIG. 1 is a cross-sectional side view of a first embodiment of an electronic display device having an integrated environmental sensor constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
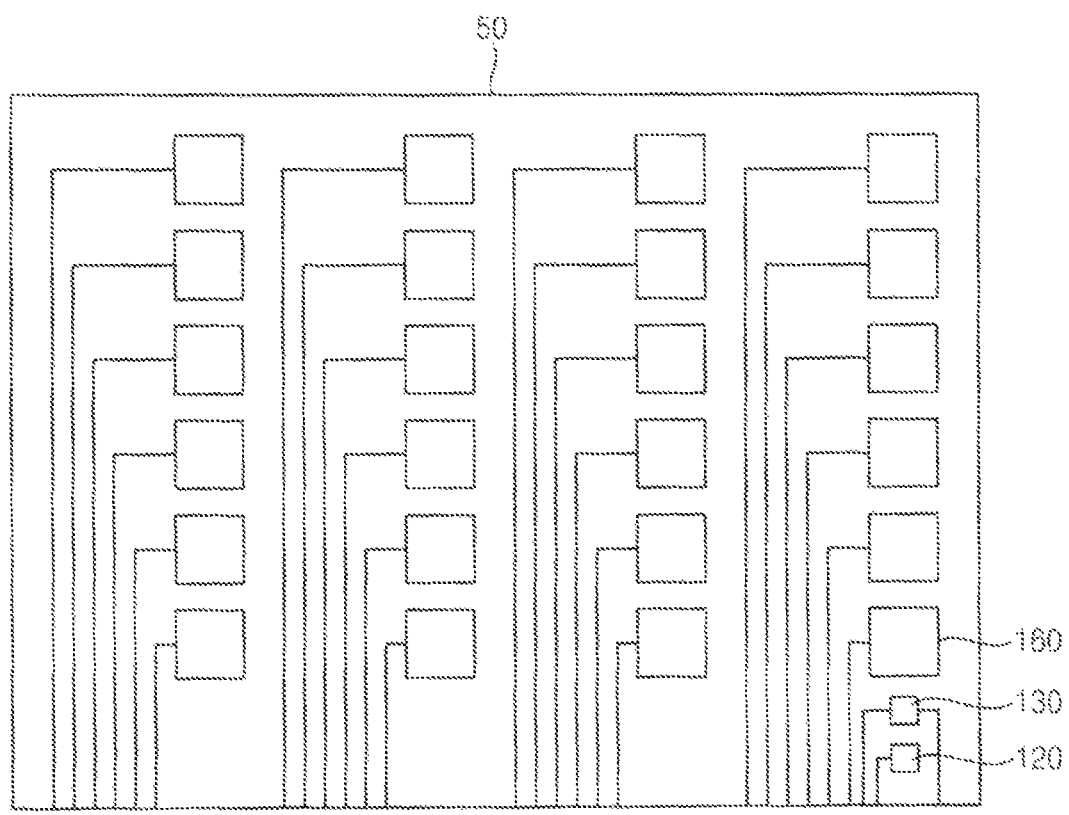
FIG. 2 is a schematic plan view of a first exemplary embodiment of a display panel including the environmental sensor of FIG. 1.
Figure 3:
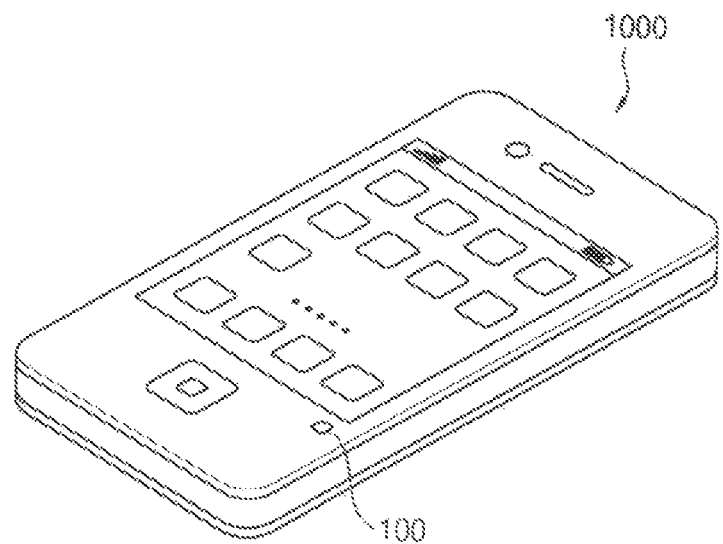
FIG. 3 is a perspective view of a first exemplary embodiment of a smart phone including the environmental sensor of FIG. 1.

Referring to FIGS. 1 through 3, the environmental sensor 100 may include a substrate 110, a first sensor electrode 120, a second sensor electrode 130, an insulating layer 140, and a cover 150. In some exemplary embodiments, the substrate 110 may be a display panel substrate 50 included in a display device, and the first sensor electrode 120, the second sensor electrode 130, and a touch sensor electrode 160 may be formed together on the substrate 110. The environmental sensor 100 may further include a sidewall 170 that prevents chemical particles from entering a region in which the touch sensor electrode 160 is formed. Thus, the sidewall 170 may be located between the touch sensor electrode 160 and the first and second sensor electrodes 120 and 130.

The environmental sensor 100 may be installed in a display device (e.g., a smart phone, a smart pad, a smart watch, etc) included in an electronic device 1000. For example, as illustrated in FIGS. 2 and 3, the electronic device 1000 may be implemented as the smart phone, and the environmental sensor 100 may be located in a peripheral region of the display device included in the electronic device 1000 (e.g., the environmental sensor 100 is located in a bezel region in FIG. 3). Generally, the display device included in the electronic device 1000 may include a touch sensor that performs a touch sensing function, and thus the touch sensor electrode 160 of the touch sensor may be formed on the display panel substrate 50 of the display device included in the electronic device 1000. That is, the touch sensor may be integrated in the display device included in the electronic device 1000. Similarly, like the touch sensor, the environmental sensor 100 may also be integrated in the display device included in the electronic device 1000. Thus, the first and second sensor electrodes 120 and 130 of the environmental sensor 100 may also be formed on the display panel substrate 50 of the display device. Hence, the substrate 110 may be the display panel substrate 50 of the display device included in the electronic device 1000.

Referring again to FIG. 1, the first sensor electrode 120 may be formed on the substrate 110 to constitute a lower portion of a first sensing unit FSU. In an example embodiment, the first sensor electrode 120 may include Graphene, Carbon Nano Tube (CNT), Silver Nano Wire (AgNW), Indium Tin Oxide (ITO), etc. The second sensor electrode 130 may be formed on the substrate 110 to constitute a lower portion of a second sensing unit SSU. In an example embodiment, the second sensor electrode 130 may include Graphene, Carbon Nano Tube, Silver Nano Wire, Indium Tin Oxide, etc.

As described above, the first sensor electrode 120, the second sensor electrode 130, and the touch sensor electrode 160 may be formed together on the substrate 110. In other words, a process of manufacturing the environmental sensor 100 may be integrated with a process of manufacturing the touch sensor (such as with a 3-mask process), and thus an additional mask for manufacturing the environmental sensor 100 might not be required.

An area of the first sensor electrode 120 (e.g., ones or tens of $\mu m^2$) and an area of the second sensor electrode 130 (e.g., ones or tens of $\mu m^2$) may be smaller than an area of the touch sensor electrode 160 (e.g., ones or tens of $mm^2$). Thus, the environmental sensor 100 might not occupy a large area in the electronic device 1000.

The insulating layer 140 may cover the first sensor electrode 120 on the substrate 110. That is, as illustrated in FIG. 1, the insulating layer 140 might not cover the second sensor electrode 130 on the substrate 110. The first sensing unit FSU that includes the first sensor electrode 120 may sense the chemical particles by using a polarity-change due to dipole moments of the chemical particles. The second sensing unit SSU that includes the second sensor electrode 130 may sense the chemical particles by using a resistance-change due to adhesions of the chemical particles.

The cover 150 may be located over the first sensor electrode 120 and the second sensor electrode 130. The cover 150 may include at least one hole HL though which the chemical particles pass. That is, the chemical particles that are external to the electronic device 1000 may pass through the hole HL of the cover 150 and then may adhere to the insulating layer 140 located on the first sensor electrode 120 or may adhere directly to the second sensor electrode 130. In an example embodiment, as illustrated in FIG. 3, the cover 150 may be a front window of the electronic device 1000, and the hole HL may be formed in a portion of the front window. In another example embodiment, the cover 150 may be a body of the electronic device 1000, and the hole HL may be a hole that is formed in a portion of the body for other uses (e.g., a speaker hole, a microphone hole, etc).

The first sensing unit FSU may include the substrate 110, the first sensor electrode 120, the insulating layer 140, and the cover 150. Thus, the first sensing unit FSU may sense a capacitance-change due to the chemical particles that pass through the hole HL of the cover 150 and then adhere to the insulating layer 140 located on the first sensor electrode 120. In various other embodiments, the first sensing unit FSU may operate based on a self-capacitance technique or on a mutual-capacitance technique.

The second sensing unit SSU may include the substrate 110, the second sensor electrode 130, and the cover 150. The second sensing unit SSU may sense a resistance-change due to the chemical particles that pass through the hole HL of the cover 150 and then adhere to the second sensor electrode 130. In some example embodiments, the touch sensor including the touch sensor electrode 160 may operate based on the self-capacitance technique or the mutual-capacitance technique.

The first sensing unit FSU may output a first sensing signal when sensing the capacitance-change due to the chemical particles that pass through the hole HL and then adhere to the insulating layer 140 located on the first sensor electrode 120. The second sensing unit SSU may output a second sensing signal when sensing the resistance-change due to the chemical particles that pass through the hole HL and then adhere to the second sensor electrode 130. The environmental sensor 100 may identify the presence of chemical particles according to whether the first sensing signal is output from the first sensing unit FSU and whether the second sensing signal is output from the second sensing unit SSU. Specifically, the first sensing unit FSU may react to first type of chemical particles and second type of chemical particles, and the second sensing unit SSU may react to the second type of chemical particles and third type of chemical particles.

For example, assuming that only one type of chemical particles among the first type of chemical particles, the second type of chemical particles, and the third type of chemical particles enter the environmental sensor 100, the chemical particles that enter the environmental sensor 100 may be determined to be the first type of chemical particles when only the first sensing signal is output from the environmental sensor 100; the chemical particles that enter the environmental sensor 100 may be determined to be the third type of chemical particles when only the second sensing signal is output from the environmental sensor 100; and, the chemical particles that enter the environmental sensor 100 may be determined to be the second type of chemical particles when the first sensing signal and the second sensing signal are output from the environmental sensor 100.

Because the chemical particles to which the first sensing unit FSU reacts are different from the chemical particles to which the second sensing unit SSU reacts, it may be determined whether the chemical particles that enter the environmental sensor 100 are the first type of chemical particles, the second type of chemical particles, or the third type of chemical particles according to whether the first sensing unit FSU reacts to the chemical particles that enter the environmental sensor 100 in combination with whether the second sensing unit SSU reacts to the chemical particles that enter the environmental sensor 100. In addition, when neither the first sensing signal nor the second sensing signal is output from the environmental sensor 100, it may be determined that none of the first, second and third type of chemical particles exist in the air (i.e., that the first type of chemical particles, the second type of chemical particles, and the third type of chemical particles do not exist in the air).

The environmental sensor 100 may have high sensing performance (i.e., high substance resolution) while being manufactured to have a small size, where the environmental sensor 100 is included in the electronic device 1000, by including the first sensor electrode 120 and the second sensor electrode 130 that have different sensing characteristics (i.e., the first sensing unit FSU including the first sensor electrode 120 reacts to the first type of chemical particles and the second type of chemical particles, and the second sensing unit SSU including the second sensor electrode 130 reacts to the second type of chemical particles and the third type of chemical particles) and by identifying types of the chemical particles that exist in the air based on the first sensing signal output from the first sensing unit FSU including the first sensor electrode 120 in combination with the second sensing signal output from the second sensing unit SSU including the second sensor electrode 130.

In various embodiments, the signals are transmitted via wirings connected to the first and second sensor electrodes 120 and 130. For example, one wiring may be connected to the first sensor electrode 120 of the first sensing unit FSU to measure the capacitance-change due to the presence of the various types of chemical particles, and two wirings may be connected to the second sensor electrode 130 of the second sensing unit SSU to measure the resistance-change due to the presence of the various types of chemical particles.

Although two sensor electrodes having different sensing characteristics (i.e., the first sensor electrode 120 sensing changes in capacitance and the second sensor electrode 130 sensing changes in resistance) are illustrated in FIG. 1, in other embodiments, the environmental sensor 100 may include three or more sensor electrodes having different sensing characteristics to achieve higher substance resolution. Further, the environmental sensor 100 may remove the chemical particles that enter the environmental sensor 100 after sensing the chemical particles by using a heating system or a blowing system that is external or internal to the environmental sensor 100. Still further, the environmental sensor 100 may be integrated (or, embedded) with the touch sensor in the display panel of the display device by various techniques (e.g., an on-cell technique, an in-cell technique, an outer-type technique, or some other technique).

Referring to FIGS. 4 through 6B, the environmental sensor 100 may drive the first sensing unit FSU and the second sensing unit SSU (S110) and then may check whether the first sensing signal is output from the first sensing unit FSU (S120). When the environmental sensor 100 determines, in step S120, that the first sensing signal is output from the first sensing unit FSU, the environmental sensor 100 may check whether the second sensing signal is output from the second sensing unit SSU (S130). When the environmental sensor 100 determines, in step S130, that the second sensing signal is not output from the second sensing unit SSU, the environmental sensor 100 may determine that the chemical particles CP that enter the environmental sensor 100 are the first type of chemical particles CP1 (S140). On the other hand, when the environmental sensor 100 determines, in step S130, that the second sensing signal is output from the second sensing unit SSU, the environmental sensor 100 may determine that the chemical particles CP that enter the environmental sensor 100 are the second type of chemical particles CP2 (S150). While it is theoretically possible that the first type of chemical particles CP1 and the third type of chemical particles CP3 may be present while the second type of chemical particles CP2 is absent, it is believed that this scenario (which would result in a "false reading" for the presence of the second type of chemical particles CP2) is sufficiently unlikely as to be tolerable. However, because the second type of chemical particles CP2 is the only one of the three types of chemical particles for which a false positive reading is possible, it is preferable that the second type of chemical particles CP2 be the most commonly occurring type of chemical particles among the three types of chemical particles CP1, CP2, CP3.

In the step S120, when the environmental sensor 100 determines that the first sensing signal is not output from the first sensing unit FSU, the environmental sensor 100 may check whether the second sensing signal is output from the second sensing unit SSU (S160). Then, when the environmental sensor 100 determines, in step S160, that the second sensing signal is output from the second sensing unit SSU, the environmental sensor 100 may determine that the chemical particles CP that enter the environmental sensor 100 are the third type of chemical particles CP3 (S170). On the other hand, when the environmental sensor 100 determines, in step S160, that the second sensing signal is not output from the second sensing unit SSU, the environmental sensor 100 may determine that none of the first, second and third type of chemical particles CP1, CP2, CP3 exist in the air (S180). That is, the environmental sensor 100 may determine in step S180 that none of the first, second and third type of chemical particles CP1, CP2, CP3 have entered the environmental sensor 100.

In summary, the environmental sensor 100 may include the first sensing unit FSU that reacts to the first type of chemical particles CP1 and the second type of chemical particles CP2 and the second sensing unit SSU that reacts to the second type of chemical particles CP2 and the third type of chemical particles CP3 and thus together may identify three different types of the chemical particles CP1, CP2, CP3 that enter the environmental sensor 100 by determining whether the first sensing signal is output from the first sensing unit FSU in combination with whether the second sensing signal is output from the second sensing unit SSU. Accordingly, the environmental sensor 100 does not need a complicated algorithm for identifying the three types of the chemical particles CP1, CP2, CP3 that enter the environmental sensor 100, and assuming the user of the environmental sensor 100 is willing to tolerate a relatively small possibility of a false positive reading for the presence of one of the three types of chemical particles, the environmental sensor 100 may achieve a high substance resolution while having a simple, compact structure as compared to a conventional environmental sensor.

The sequence of the steps S120, S130, and S160 shown in FIG. 4 may be changed according to requirements for the environmental sensor 100. Thus, in other embodiments, whether the first sensing signal is output from the first sensing unit FSU may be checked after whether the second sensing signal is output from the second sensing unit SSU is checked rather than before as with the embodiment of FIG. 4. In still other embodiments, whether the first sensing signal is output from the first sensing unit FSU and whether the second sensing signal is output from the second sensing unit SSU may be checked at the same time.

Figure 5A:
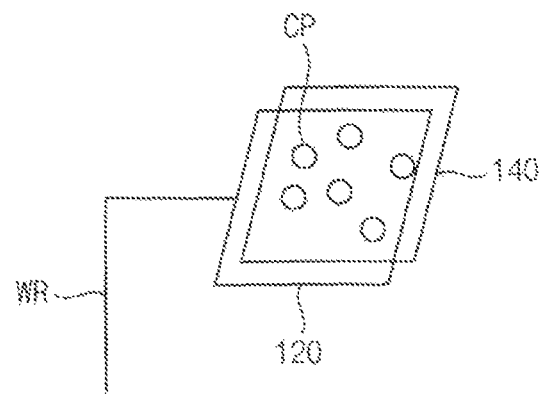
FIG. 5A is a schematic diagram illustrating a first sensing unit of the environmental sensor of FIG. 1 for sensing chemical particles.

FIGS. 5A through 6B shows how the environmental sensor 100 identifies types of the chemical particles CP that enter the environmental sensor 100 based on the first sensing signal output from the first sensing unit FSU and the second sensing signal output from the second sensing unit SSU. Specifically, as illustrated in FIG. 5A, the first sensing unit FSU of the environmental sensor 100 may sense the capacitance-change due to the chemical particles CP that pass through the hole HL of the cover 150 and then adhere to the insulating layer 140 that is located on the first sensor electrode 120. One wiring WR may be connected to the first sensor electrode 120 of the first sensing unit FSU to measure the capacitance-change.

Figure 5B:
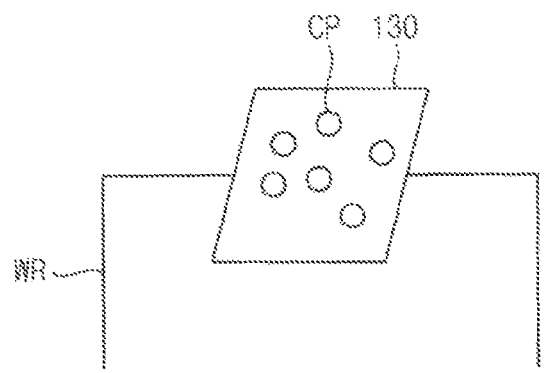
FIG. 5B is a schematic diagram illustrating a second sensing unit of the environmental sensor of FIG. 1 for sensing chemical particles.

In addition, as illustrated in FIG. 5B, the second sensing unit SSU of the environmental sensor 100 may sense the resistance-change due to the chemical particles CP that pass through the hole HL of the cover 150 and then adhere to the second sensor electrode 130. Two wirings WR may be connected to the second sensor electrode 130 of the second sensing unit SSU to measure the resistance-change. In brief, since the first sensor electrode 120 of the first sensing unit FSU and the second sensor electrode 130 of the second sensing unit SSU have different sensing characteristics (i.e., the first sensing unit FSU senses the capacitance-change due to the chemical particles CP, and the second sensing unit SSU senses the resistance-change due to the chemical particles CP), the environmental sensor 100 may identify types of the chemical particles CP that enter the environmental sensor 100 based on the sensing characteristics.

Figure 6A:
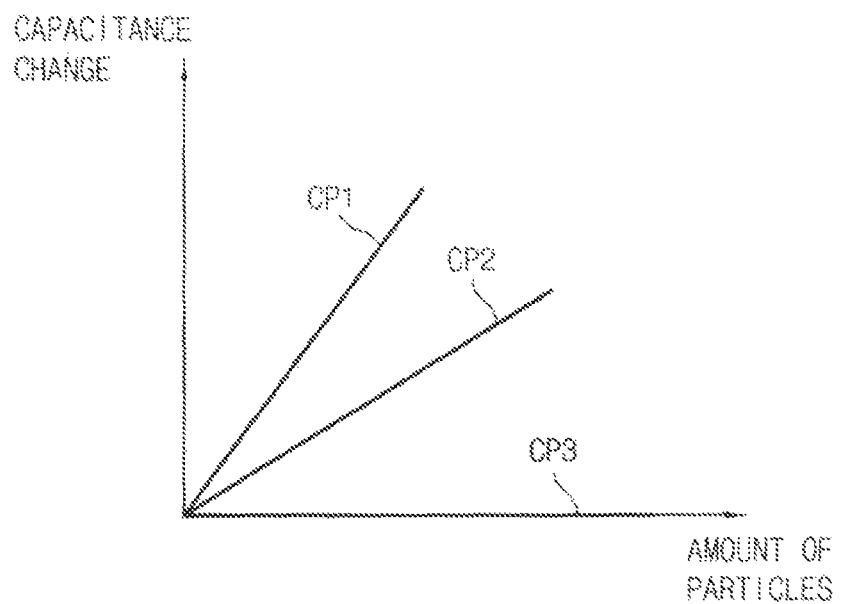
FIG. 6A is a graph illustrating a first embodiment of how chemical particles CP 1, CP2 and CP3 are sensed by the first sensing unit of the environmental sensor of FIG. 1.

For example, as illustrated in FIG. 6A, the first sensing unit FSU of the environmental sensor 100 may react to the first type of chemical particles CP1 and the second type of chemical particles CP2 but might not react to the third type of chemical particles CP3. In other words, the capacitance-change may increase as the number of the first type of chemical particles CP1 or the second type of chemical particles CP2 that adhere to the insulating layer 140 located on the first sensor electrode 120 increases, but the capacitance might not increase or decrease as the number of the third type of chemical particles CP3 that adhere to the insulating layer 140 located on the first sensor electrode 120 increases.

Figure 6B:
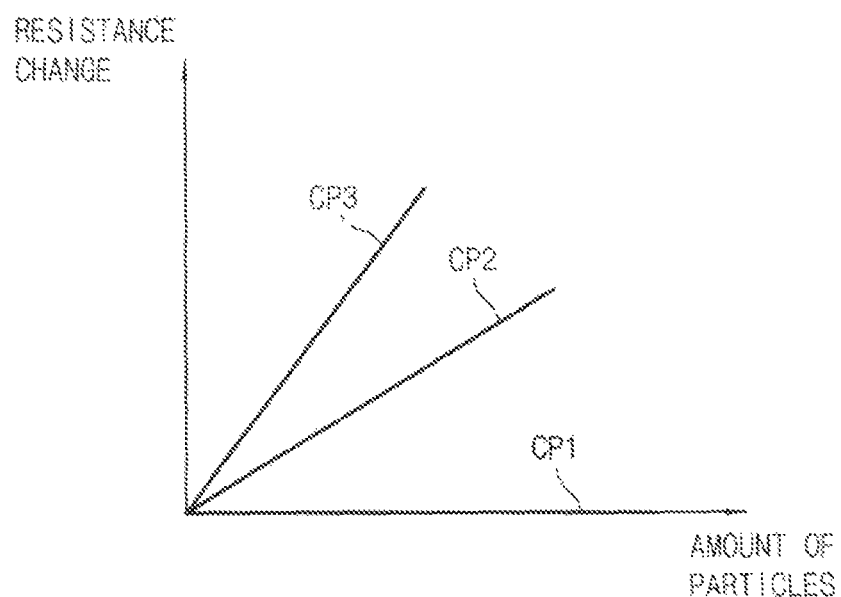
FIG. 6B is a graph illustrating a first embodiment of how the chemical particles CP 1, CP2 and CP3 are sensed by the second sensing unit of the environmental sensor of FIG. 1.

In addition, as illustrated in FIG. 6B, the second sensing unit SSU of the environmental sensor 100 may react to the second type of chemical particles CP2 and the third type of chemical particles CP3 but might not react to the first type of chemical particles CP1. In other words, the resistance-change may increase as the number of the second type of chemical particles CP2 or the third type of chemical particles CP3 that adhere to the second sensor electrode 130 increases, but the resistance might not increase or decrease as the number of the first type of chemical particles CP1 that adhere to the second sensor electrode 130 increases. Thus, assuming that only one type of chemical particles CP among the first type of chemical particles CP1, the second type of chemical particles CP2, and the third type of chemical particles CP3 enter the environmental sensor 100, the chemical particles CP that enter the environmental sensor 100 may be determined as the first type of chemical particles CP1 when only the first sensing signal is output from the environmental sensor 100; the chemical particles CP that enter the environmental sensor 100 may be determined as the third type of chemical particles CP3 when only the second sensing signal is output from the environmental sensor 100; and, the chemical particles CP that enter the environmental sensor 100 may be determined as the second type of chemical particles CP2 when the first sensing signal and the second sensing signal are output from the environmental sensor 100 (i.e., both the first sensing unit FSU and the second sensing unit SSU react to the second type of chemical particles CP2). In addition, when neither the first sensing signal nor the second sensing signal is output from the environmental sensor 100, it may be determined that none of the first, second and third types of chemical particles CP1, CP2, CP3 exist in the air.

Figure 7:
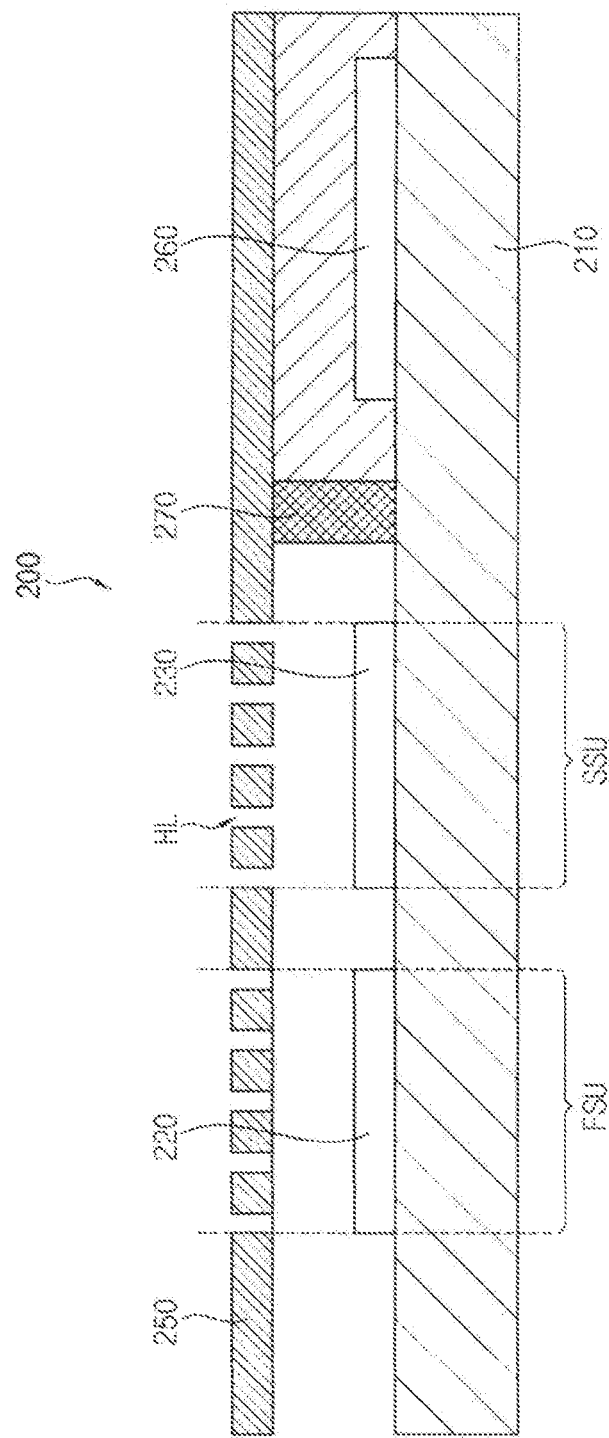
FIG. 7 is a cross-sectional side view of a second embodiment of an electronic display device having an integrated environmental sensor constructed according to the principles of the invention.
Figure 8A:
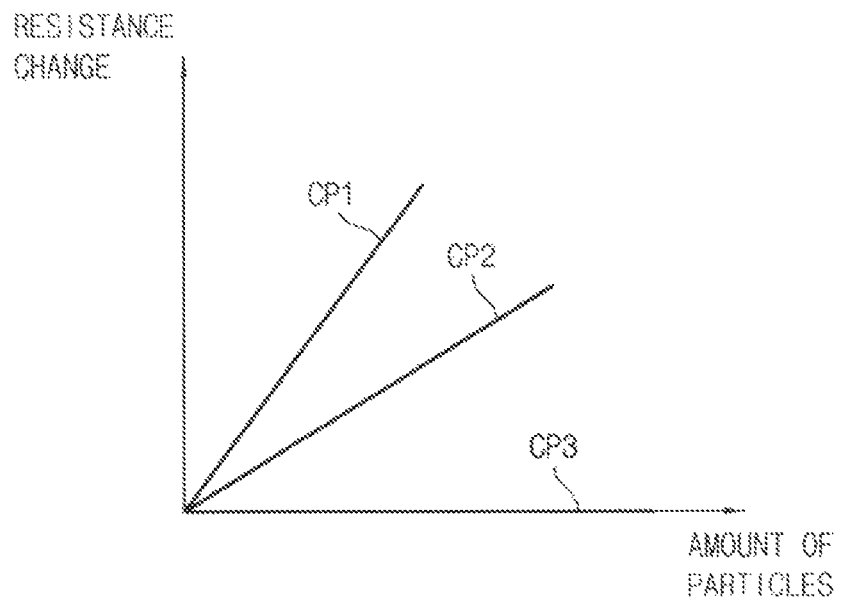
FIG. 8A is a graph illustrating a first embodiment of how chemical particles CP 1, CP2 and CP3 are sensed by a first sensing unit of the environmental sensor of FIG. 7.
Figure 8B:
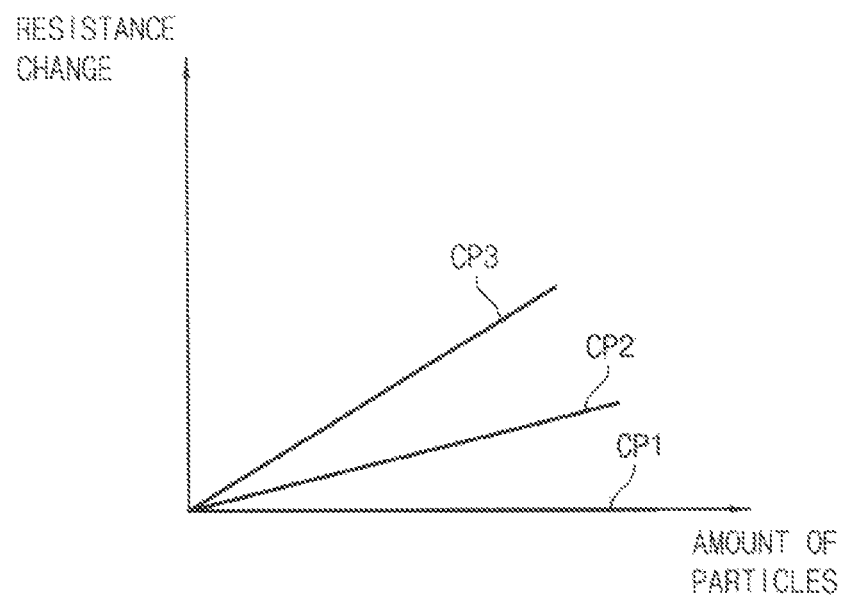
FIG. 8B is a graph illustrating a first embodiment of how chemical particles CP 1, CP2 and CP3 are sensed by a second sensing unit of the environmental sensor of FIG. 7.

Referring to FIGS. 7 through 8B, the environmental sensor 200 according to this example may include a substrate 210, a first sensor electrode 220, a second sensor electrode 230, and a cover 250. In some example embodiments, the substrate 210 may be a display panel substrate included in a display device, and the first sensor electrode 220, the second sensor electrode 230, and a touch sensor electrode 260 may be formed together on the substrate 210. In this case, the environmental sensor 200 may further include a sidewall 270 that prevents chemical particles from entering a region in which the touch sensor electrode 260 is formed. Thus, the sidewall 270 may be located between the touch sensor electrode 260 and the first and second sensor electrodes 220 and 230, and an insulating layer that covers the touch sensor electrode 260 may be formed in the region in which the touch sensor electrode 260 is formed. However, an insulating layer might not be formed on the first and second sensor electrodes 220 and 230. That is, the environmental sensor 200 might not include the insulating layer covering the first and second sensor electrodes 220 and 230 as it does in other embodiments. While not visible in this sectional view, the environmental sensor 200 includes structural members extending between and supporting the cover 250 on the substrate 210.

The environmental sensor 200 may be installed in a display device included in an electronic device. That is, the environmental sensor 200 may be integrated in the display device included in the electronic device. Thus, the first and second sensor electrodes 220 and 230 of the environmental sensor 200 may be formed on the display panel substrate of the display device included in the electronic device. Hence, the substrate 210 may be the display panel substrate of the display device included in the electronic device. The first sensor electrode 220 may be formed on the substrate 210 to constitute a first sensing unit FSU. In an example embodiment, the first sensor electrode 220 may include Graphene, Carbon Nano Tube, Silver Nano Wire, Indium Tin Oxide, etc. The second sensor electrode 230 may be formed on the substrate 210 to constitute a second sensing unit SSU. In an example embodiment, the second sensor electrode 230 may include Graphene, Carbon Nano Tube, Silver Nano Wire, Indium Tin Oxide, etc. As described above, the first sensor electrode 220, the second sensor electrode 230, and the touch sensor electrode 260 may be formed together on the substrate 210. In other words, a process of manufacturing the environmental sensor 200 may be integrated with a process of manufacturing the touch sensor, and thus an additional mask for manufacturing the environmental sensor 200 might not be required.

In example embodiments, an area of the first sensor electrode 220 and an area of the second sensor electrode 230 may be smaller than an area of the touch sensor electrode 260. Thus, the environmental sensor 200 might not occupy a large area in the electronic device. The cover 250 may be located over the first sensor electrode 220 and the second sensor electrode 230. The cover 250 may include at least one hole HL though which the chemical particles pass. That is, the chemical particles that are external to the electronic device may pass through the hole HL of the cover 250 and then may adhere to the first sensor electrode 220 or the second sensor electrode 230.

The first sensing unit FSU may thus include the substrate 210, the first sensor electrode 220, and the cover 250. The first sensing unit FSU may sense a first resistance-change due to the chemical particles that pass through the hole HL of the cover 250 and then adhere to the first sensor electrode 220. In addition, the second sensing unit SSU may include the substrate 210, the second sensor electrode 230, and the cover 250. The second sensing unit SSU may sense a second resistance-change due to the chemical particles that pass through the hole HL of the cover 250 and then adhere to the second sensor electrode 230.

The first sensing unit FSU may output a first sensing signal when sensing the first resistance-change due to the chemical particles that pass through the hole HL and then adhere to the first sensor electrode 220. The second sensing unit SSU may output a second sensing signal when sensing the second resistance-change due to the chemical particles that pass through the hole HL and then adhere to the second sensor electrode 230.

The environmental sensor 200 may identify types of the chemical particles according to whether the first sensing signal is output from the first sensing unit FSU and whether the second sensing signal is output from the second sensing unit SSU because the first sensor electrode 220 of the first sensing unit FSU and the second sensor electrode 230 of the second sensing unit SSU have different resistance-change characteristics. Specifically, the first sensing unit FSU may react to the first type of chemical particles CP1 and the second type of chemical particles CP2, and the second sensing unit SSU may react to the second type of chemical particles CP2 and the third type of chemical particles CP3.

For example, as illustrated in FIG. 8A, in the first sensing unit FSU of the environmental sensor 200, the first resistance-change may increase as the number of the first type of chemical particles CP1 or the second type of chemical particles CP2 that adhere to the first sensor electrode 220 increases, but the first resistance might not increase or decrease as the number of the third type of chemical particles CP3 that adhere to the first sensor electrode 220 increases. Similarly, as illustrated in FIG. 8B, in the second sensing unit SSU of the environmental sensor 200, the second resistance-change may increase as the number of the second type of chemical particles CP2 or the third type of chemical particles CP3 that adhere to the second sensor electrode 230 increases, but the second resistance might not increase or decrease as the number of the first type of chemical particles CP1 that adhere to the second sensor electrode 230 increases.

Thus, assuming that only one type of chemical particles among the first type of chemical particles CP1, the second type of chemical particles CP2, and the third type of chemical particles CP3 enter the environmental sensor 200, the chemical particles that enter the environmental sensor 200 may be determined as the first type of chemical particles CP1 when only the first sensing signal is output from the environmental sensor 200; the chemical particles that enter the environmental sensor 200 may be determined as the third type of chemical particles CP3 when only the second sensing signal is output from the environmental sensor 200; and, the chemical particles that enter the environmental sensor 200 may be determined as the second type of chemical particles CP2 when the first sensing signal and the second sensing signal are output from the environmental sensor 200.

Because the chemical particles to which the first sensing unit FSU reacts are different from the chemical particles to which the second sensing unit SSU reacts, it may be determined whether the chemical particles that enter the environmental sensor 200 are the first type of chemical particles CP1, the second type of chemical particles CP2, or the third type of chemical particles CP3 according to whether the first sensing unit FSU reacts to the chemical particles that enter the environmental sensor 200 in combination with whether the second sensing unit SSU reacts to the chemical particles that enter the environmental sensor 200. In addition, when neither the first sensing signal nor the second sensing signal is output from the environmental sensor 200, it may be determined that no chemical particles exist in the air (i.e., that the first type of chemical particles CP1, the second type of chemical particles CP2, and the third type of chemical particles CP3 do not exist in the air).

As described above, the environmental sensor 200 may have high sensing performance (i.e., high substance resolution) while being manufactured to have a small size, where the environmental sensor 200 is included in the electronic device, by including the first sensor electrode 220 and the second sensor electrode 230 that have different sensing characteristics (i.e., the first sensor electrode 220 and the second sensor electrode 230 have different resistance-change characteristics) and by identifying types of the chemical particles that exist in the air based on the first sensing signal output from the first sensing unit FSU including the first sensor electrode 220 in combination with the second sensing signal output from the second sensing unit SSU including the second sensor electrode 230.

Wirings are connected to the first and second sensor electrodes 220 and 230 in a manner akin to the wirings WR shown in FIG. 5B. In addition, although two sensor electrodes having different sensing characteristics (i.e., the first sensor electrode 220 and the second sensor electrode 230) are illustrated in FIG. 7, in various exemplary embodiments, the environmental sensor 200 may include three or more sensor electrodes having different sensing characteristics to achieve an even higher substance resolution. Further, in various exemplary embodiments, the environmental sensor 200 may remove the chemical particles that enter the environmental sensor 200 from the environmental sensor 200 after sensing the chemical particles by using a heating system or a blowing system that is external or internal to the environmental sensor 200. In some example embodiments, the environmental sensor 200 may be integrated (or, embedded) with the touch sensor in the display panel of the display device by various techniques (e.g., an on-cell technique, an in-cell technique, an outer-type technique, etc). However, a technique by which the environmental sensor 200 is integrated in the display panel of the display device is not limited thereto.

Figure 9:
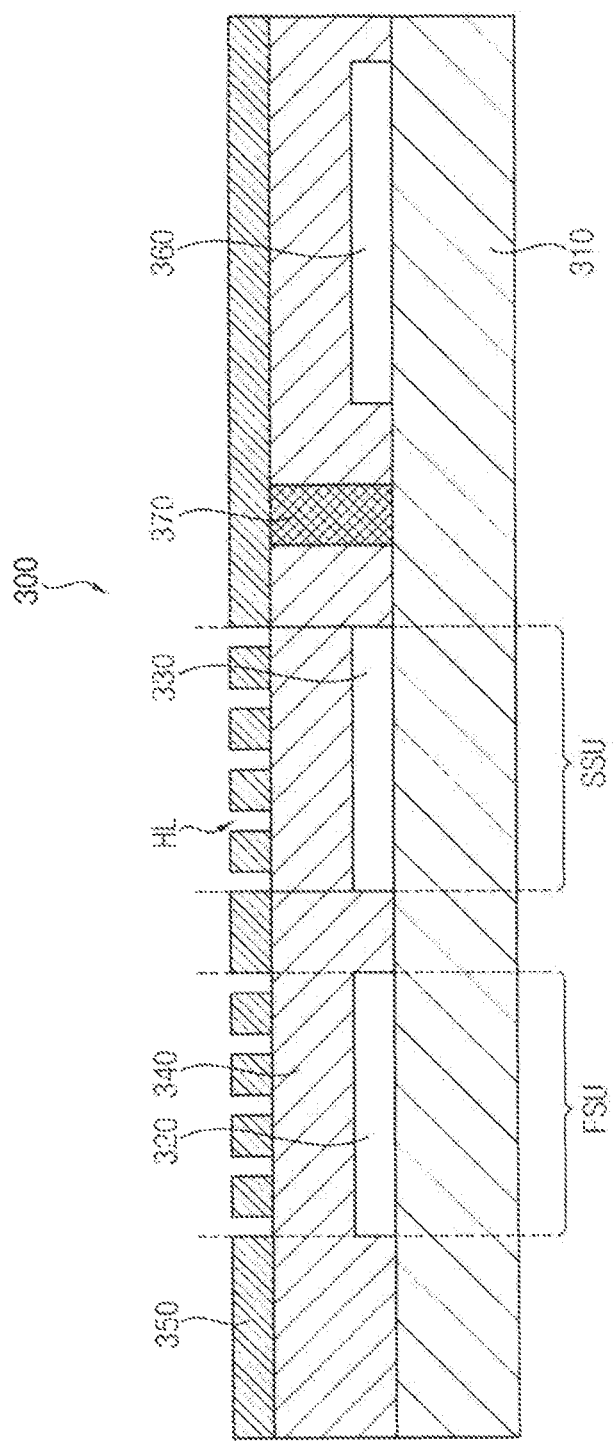
FIG. 9 is a cross-sectional side view of a third embodiment of an electronic display device having an integrated environmental sensor constructed according to the principles of the invention.
Figure 10A:
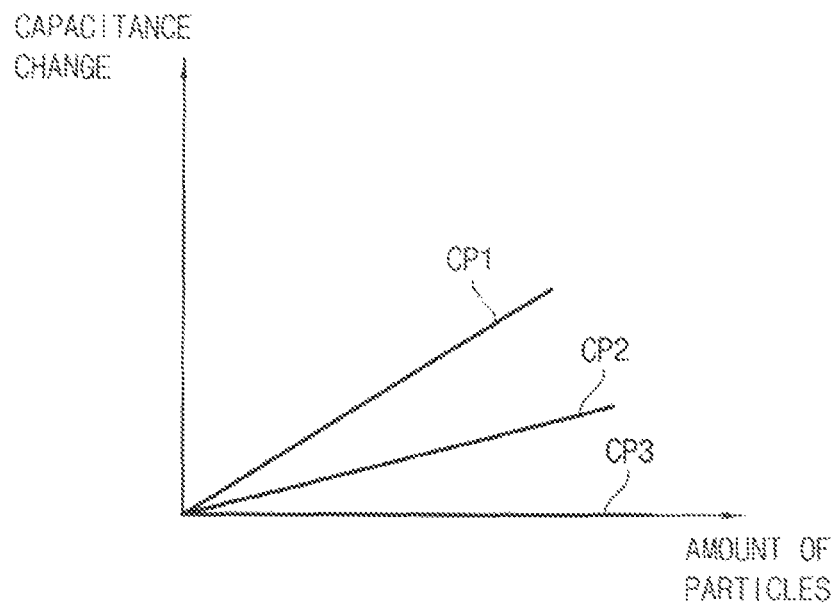
FIG. 10A is a graph illustrating a first embodiment of how chemical particles CP 1, CP2 and CP3 are sensed by a first sensing unit of the environmental sensor of FIG. 9.
Figure 10B:
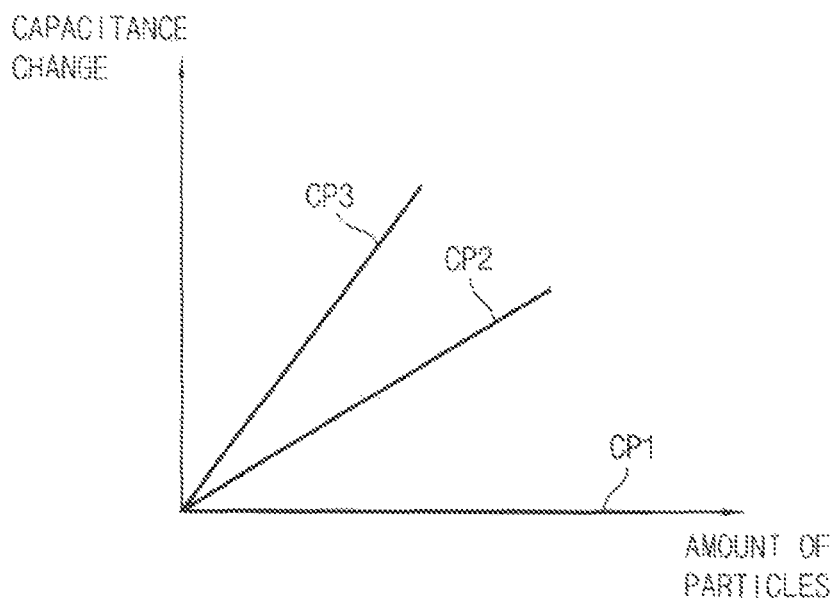
FIG. 10B is a graph illustrating a first embodiment of how chemical particles CP 1, CP2 and CP3 are sensed by a second sensing unit of the environmental sensor of FIG. 9.

Referring to FIGS. 9 through 10B, the environmental sensor 300 according to this example may include a substrate 310, a first sensor electrode 320, a second sensor electrode 330, an insulating layer 340, and a cover 350. In some example embodiments, the substrate 310 may be a display panel substrate included in a display device, and the first sensor electrode 320, the second sensor electrode 330, and a touch sensor electrode 360 may be formed together on the substrate 310. Thus, the environmental sensor 300 may further include a sidewall 370 that prevents chemical particles from entering a region in which the touch sensor electrode 360 is formed. Thus, the sidewall 370 may be located between the touch sensor electrode 360 and the first and second sensor electrodes 320 and 330.

The environmental sensor 300 may be installed in a display device included in an electronic device. That is, the environmental sensor 300 may be integrated in the display device included in the electronic device. Thus, the first and second sensor electrodes 320 and 330 of the environmental sensor 300 may be formed on the display panel substrate of the display device included in the electronic device. Hence, the substrate 310 may be the display panel substrate of the display device included in the electronic device. The first sensor electrode 320 may be formed on the substrate 310 to constitute a first sensing unit FSU. In an example embodiment, the first sensor electrode 320 may include Graphene, Carbon Nano Tube, Silver Nano Wire, Indium Tin Oxide, etc. The second sensor electrode 330 may be formed on the substrate 310 to constitute a second sensing unit SSU. In an example embodiment, the second sensor electrode 330 may include Graphene, Carbon Nano Tube, Silver Nano Wire, Indium Tin Oxide, etc.

As described above, the first sensor electrode 320, the second sensor electrode 330, and the touch sensor electrode 360 may be formed together on the substrate 310. In other words, a process of manufacturing the environmental sensor 300 may be integrated with a process of manufacturing the touch sensor, and thus an additional mask for manufacturing the environmental sensor 300 might not be required.

In example embodiments, an area of the first sensor electrode 320 and an area of the second sensor electrode 330 may be smaller than an area of the touch sensor electrode 360. Thus, the environmental sensor 300 might not occupy a large area in the electronic device.

The insulating layer 340 may cover the first sensor electrode 320 and the second sensor electrode 330 on the substrate 310. The cover 350 may be located over the first sensor electrode 320 and the second sensor electrode 330. The cover 350 may include at least one hole HL though which the chemical particles pass. That is, the chemical particles that are external to the electronic device may pass through the hole HL of the cover 350 and then may adhere to the insulating layer 340 located on the first sensor electrode 320 or the insulating layer 340 located on the second sensor electrode 330.

In summary, the first sensing unit FSU may include the substrate 310, the first sensor electrode 320, the insulating layer 340, and the cover 350. Thus, the first sensing unit FSU may sense a first capacitance-change due to the chemical particles that pass through the hole HL of the cover 350 and then adhere to the insulating layer 340 located on the first sensor electrode 320. In addition, the second sensing unit SSU may include the substrate 310, the second sensor electrode 330, the insulating layer 340, and the cover 350. Thus, the second sensing unit SSU may sense a second capacitance-change due to the chemical particles that pass through the hole HL of the cover 350 and then adhere to the insulating layer 340 located on the second sensor electrode 330.

The first sensing unit FSU may output a first sensing signal when sensing the first capacitance-change due to the chemical particles that pass through the hole HL and then adhere to the insulating layer 340 located on the first sensor electrode 320. The second sensing unit SSU may output a second sensing signal when sensing the second capacitance-change due to the chemical particles that pass through the hole HL and then adhere to the insulating layer 340 located on the second sensor electrode 330.

The environmental sensor 300 may identify types of the chemical particles according to whether the first sensing signal is output from the first sensing unit FSU in combination with whether the second sensing signal is output from the second sensing unit SSU because the first sensor electrode 320 of the first sensing unit FSU and the second sensor electrode 330 of the second sensing unit SSU have different capacitance-change characteristics. Specifically, the first sensing unit FSU may react to the first type of chemical particles CP1 and the second type of chemical particles CP2;

and, the second sensing unit SSU may react to the second type of chemical particles CP2 and third type of chemical particles CP3. For example, as illustrated in FIG. 10A, in the first sensing unit FSU of the environmental sensor 300, the first capacitance-change may increase as the number of the first type of chemical particles CP1 or the second type of chemical particles CP2 that adhere to the insulating layer 340 located on the first sensor electrode 320 increases; but, the first capacitance might not increase or decrease as the number of the third type of chemical particles CP3 that adhere to the insulating layer 340 located on the first sensor electrode 320 increases.

In addition, as illustrated in FIG. 10B, in the second sensing unit SSU of the environmental sensor 300, the second capacitance-change may increase as the number of the second type of chemical particles CP2 or the third type of chemical particles CP3 that adhere to the insulating layer 340 located on the second sensor electrode 330 increases; but, the second capacitance-change might not increase or decrease as the number of the first type of chemical particles CP1 that adhere to the insulating layer 340 located on the second sensor electrode 330 increases. Thus, assuming that only one type of chemical particles among the first type of chemical particles CP1, the second type of chemical particles CP2, and the third type of chemical particles CP3 enter the environmental sensor 300, the chemical particles that enter the environmental sensor 300 may be determined to be the first type of chemical particles CP1 when only the first sensing signal is output from the environmental sensor 300; the chemical particles that enter the environmental sensor 300 may be determined to be the third type of chemical particles CP3 when only the second sensing signal is output from the environmental sensor 300; and, the chemical particles that enter the environmental sensor 300 may be determined to be the second type of chemical particles CP2 when the first sensing signal and the second sensing signal are output from the environmental sensor 300.

In summary, since the chemical particles to which the first sensing unit FSU reacts are different from the chemical particles to which the second sensing unit SSU reacts, it may be determined whether the chemical particles that enter the environmental sensor 300 are the first type of chemical particles CP1, the second type of chemical particles CP2, or the third type of chemical particles CP3 according to whether the first sensing unit FSU reacts to the chemical particles that enter the environmental sensor 300 and whether the second sensing unit SSU reacts to the chemical particles that enter the environmental sensor 300. In addition, when neither the first sensing signal nor the second sensing signal is output from the environmental sensor 300, it may be determined that none of the first, second and third type of chemical particles CP1, CP2, CP3 exist in the air.

As described above, the environmental sensor 300 may have high sensing performance (i.e., high substance resolution) while being manufactured to have a small size, where the environmental sensor 300 is included in the electronic device, by including the first sensor electrode 320 and the second sensor electrode 330 that have different sensing characteristics (i.e., the first sensor electrode 320 and the second sensor electrode 330 have different capacitance-change characteristics) and by identifying types of the chemical particles that exist in the air based on the first sensing signal output from the first sensing unit FSU including the first sensor electrode 320 in combination with the second sensing signal output from the second sensing unit SSU including the second sensor electrode 330.

Wirings connected to the first and second sensor electrodes 320 and 330 are comparable to the wiring WR shown in FIG. 5A. In addition, although two sensor electrodes having different sensing characteristics (i.e., the first sensor electrode 320 and the second sensor electrode 330) are illustrated in FIG. 9, in various exemplary embodiments, the environmental sensor 300 may include three or more sensor electrodes having different sensing characteristics to achieve an even higher substance resolution.

Further, in various exemplary embodiments, the environmental sensor 300 may remove the chemical particles that enter the environmental sensor 300 after sensing the chemical particles by using a heating system or a blowing system that is external or internal to the environmental sensor 300. In some example embodiments, the environmental sensor 300 may be integrated (or, embedded) with the touch sensor in the display panel of the display device by various techniques (e.g., an on-cell technique, an in-cell technique, an outer-type technique, etc.). However, a technique by which the environmental sensor 300 is integrated in the display panel of the display device is not limited thereto.

Figure 11:
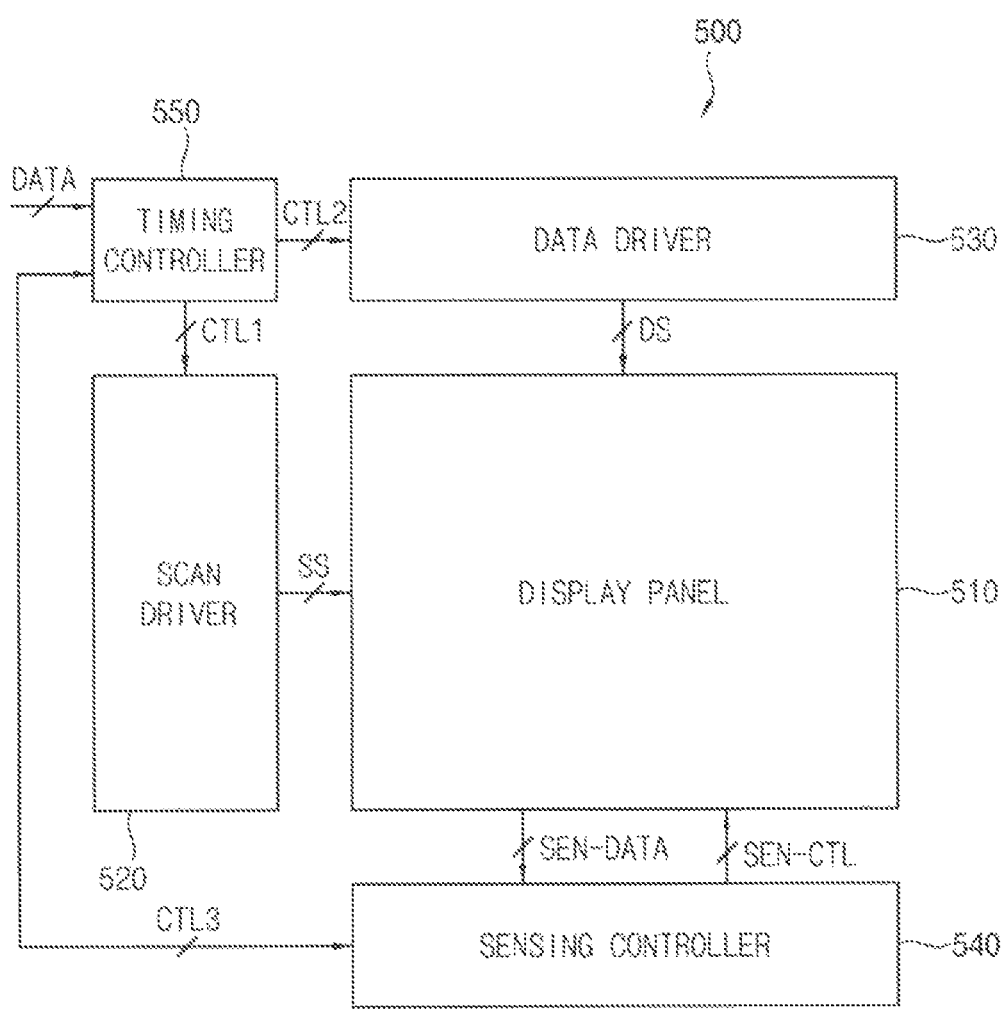
FIG. 11 is a block diagram showing illustrative circuitry for a display device having an integrated environment sensor according to example embodiments.

Referring to FIG. 11, the display device 500 may include a display panel 510, a scan driver 520, a data driver 530, a sensing controller 540, and a timing controller 550. For example, the display device 500 may be an organic light emitting display (OLED) device or a liquid crystal display (LCD) device. However, the display device 500 is not limited thereto.

The display panel 510 may include a plurality of pixel circuits. Here, the pixel circuits may be arranged in a matrix form in the display panel 510. The display device 500 may include a touch sensor that performs a touch sensing function and an environmental sensor constructed according to the inventive concepts that senses chemical particles that exist in the air. Thus, a touch sensor electrode of the touch sensor and an environmental sensor electrode of the environmental sensor (i.e., a first sensor electrode and a second sensor electrode) may be formed on a display panel substrate of the display device 500. That is, the touch sensor and the environmental sensor may be integrated in the display device 500.

The environmental sensor may include a substrate, a first sensor electrode that is formed on the substrate to constitute a first sensing unit, a second sensor electrode that is formed on the substrate to constitute a second sensing unit, an insulating layer that covers the first sensor electrode on the substrate, and a cover that includes at least one hole through which the chemical particles pass, where the cover is located over the first and second sensor electrodes. The first sensing unit may sense a capacitance-change due to the chemical particles that pass through the hole and then adhere to the insulating layer that is located on the first sensor electrode. The second sensing unit may sense a resistance-change due to the chemical particles that pass through the hole and then adhere to the second sensor electrode.

Alternatively, the environmental sensor may include a substrate, a first sensor electrode that is formed on the substrate to constitute a first sensing unit, a second sensor electrode that is formed on the substrate to constitute a second sensing unit, and a cover that includes at least one hole through which the chemical particles pass, where the cover is located over the first and second sensor electrodes. The first sensor electrode and the second sensor electrode may have different resistance-change characteristics. The first sensing unit may sense a first resistance-change due to the chemical particles that pass through the hole and then adhere to the first sensor electrode. The second sensing unit may sense a second resistance-change due to the chemical particles that pass through the hole and then adhere to the second sensor electrode.

In other exemplary embodiments, the environmental sensor may include a substrate, a first sensor electrode that is formed on the substrate to constitute a first sensing unit, a second sensor electrode that is formed on the substrate to constitute a second sensing unit, an insulating layer that covers the first and second sensor electrodes on the substrate, and a cover that includes at least one hole through which the chemical particles pass, where the cover is located over the first and second sensor electrodes. The first sensor electrode and the second sensor electrode may have different capacitance-change characteristics. The first sensing unit may sense a first capacitance-change due to the chemical particles that pass through the hole and then adhere to the insulating layer that is located on the first sensor electrode. The second sensing unit may sense a second capacitance-change due to the chemical particles that pass through the hole and then adhere to the insulating layer that is located on the second sensor electrode.

As described above, since the first sensor electrode of the first sensing unit and the second sensor electrode of the second sensing unit have different sensing characteristics, the first sensing unit may output a first sensing signal in response to the first type of chemical particles and the second type of chemical particles; and, the second sensing unit may output a second sensing signal in response to the second type of chemical particles and the third type of chemical particles. As a result, assuming that only one type of chemical particles among the first type of chemical particles CP1, the second type of chemical particles CP2, and the third type of chemical particles CP3 enter the environmental sensor, the chemical particles that enter the environmental sensor may be determined to be the first type of chemical particles CP1 when only the first sensing signal is output from the environmental sensor; the chemical particles that enter the environmental sensor may be determined to be the third type of chemical particles when only the second sensing signal is output from the environmental sensor; and, the chemical particles that enter the environmental sensor may be determined to be the second type of chemical particles when the first sensing signal and the second sensing signal are output from the environmental sensor. In addition, when neither the first sensing signal nor the second sensing signal is output from the environmental sensor, it may be determined that none of the first, second and third type of chemical particles exist in the air.

The scan driver 520 may be connected to the display panel 510 via scan-lines. The scan driver 520 may provide a scan signal SS to the display panel 510 via the scan-lines. The data driver 530 may be connected to the display panel 510 via data-lines. The data driver 530 may provide a data signal DS to the display panel 510 via the data-lines. The sensing controller 540 may control the environmental sensor as well as the touch sensor. For example, the sensing controller 540 may control the touch sensor included in the display panel 510 by sensing a user's touch input based on sensing data SEN-DATA output from the touch sensor included in the display panel 510 and by providing a sensing control signal SEN-CTL to the display panel 510.

In addition, the sensing controller 540 may control the environmental sensor included in the display panel 510 by sensing the chemical particles that exist in the air based on sensing data SEN-DATA output from the environmental sensor included in the display panel 510 and by providing a sensing control signal SEN-CTL to the display panel 510.

When the environmental sensor includes a sensing unit that senses a capacitance-change due to the chemical particles, the sensing controller 540 may sense the capacitance-change based on the same technique as the touch sensor (e.g., the sensing controller 540 may use the same circuit as the touch sensor). In addition, when the environmental sensor includes a sensing unit that senses the resistance-change due to the chemical particles, the sensing controller 540 may detect the resistance-change by using a Wheatstone bridge circuit and the like.

The timing controller 550 may generate a first control signal CTL1, a second control signal CTL2, and a third control signal CTL3 to control the scan driver 520, the data driver 530, and the sensing controller 540. In some example embodiments, the timing controller 550 may receive image data DATA from an external component, may perform a specific processing (e.g., deterioration compensation, etc), and then may provide processed image data DATA to the data driver 530. In brief, the display device 500 may include the environmental sensor that has high sensing performance (i.e., high substance resolution) while having a small size because the environmental sensor and the touch sensor are manufactured together.

Figure 12:
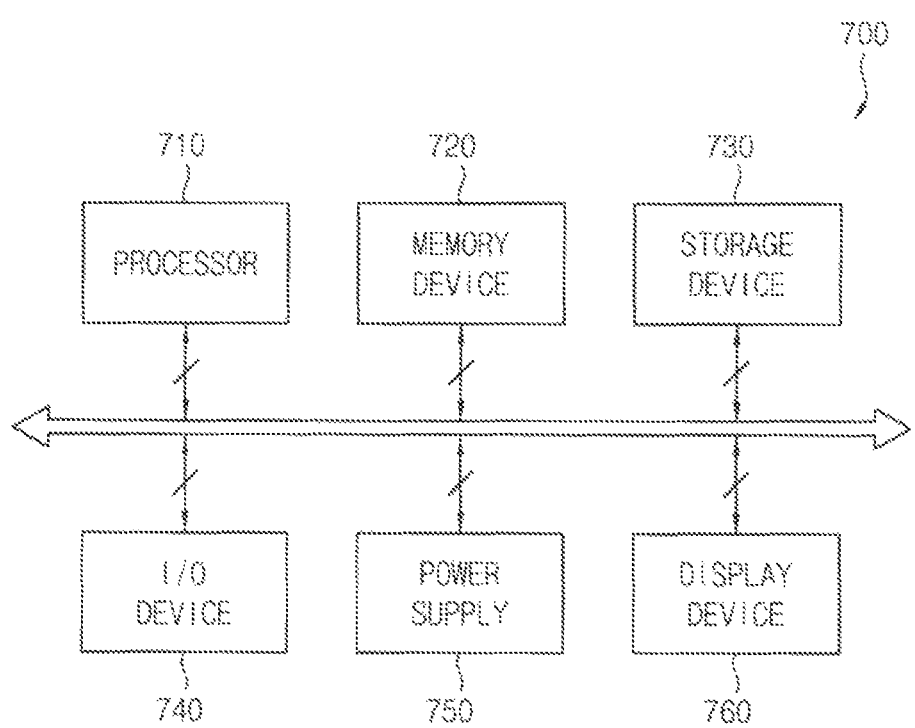
FIG. 12 is a schematic diagram illustrating a display device having an integrated environment sensor constructed according to the principles of the invention.

Referring to FIG. 12, the electronic device 700 may include a processor 710, a memory device 720, a storage device 730, an input/output (I/O) device 740, a power supply 750, and a display device 760. The display device 760 may correspond to a display device 500 of FIG. 11. The electronic device 700 may further include a plurality of ports for communicating a video card, a sound card, a memory card, a universal serial bus (USB) device, other electronic devices, etc. The electronic device 700 may be implemented as a smart phone. However, the electronic device 700 is not limited thereto. For example, the electronic device 700 may be implemented as a cellular phone, a video phone, a smart pad, a smart watch, a tablet PC, a car navigation system, a computer monitor, a laptop, a television, a head mounted display (HMD) device, etc.

The processor 710 may perform various computing functions. The processor 710 may be a micro processor, a central processing unit (CPU), an application processor (AP), etc. The processor 710 may be coupled to other components via an address bus, a control bus, a data bus, etc. Further, the processor 710 may be coupled to an extended bus such as a peripheral component interconnection (PCI) bus.

The memory device 720 may store data for operations of the electronic device 700. For example, the memory device 720 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc.

The storage device 730 may include a solid state drive (SSD) device, a hard disk drive (HDD) device, a CD-ROM device, etc. The I/O device 740 may include an input device such as a keyboard, a keypad, a mouse device, a touchpad, a touch-screen, etc, and an output device such as a printer, a speaker, etc. The power supply 750 may provide power for operations of the electronic device 700. The display device 1060 may be coupled to other components via the buses or other communication links. The display device 760 may be included in the I/O device 740.

As described above, the display device 760 may include a touch sensor that senses a user's touch input and an environmental sensor that senses chemical particles that exist in the air. The environmental sensor may have a small size because the environmental sensor and the touch sensor are manufactured together. In addition, the environmental sensor may have high sensing performance (i.e., high substance resolution).

In various exemplary embodiments, the environmental sensor may include a substrate, a first sensor electrode that is formed on the substrate to constitute a first sensing unit, a second sensor electrode that is formed on the substrate to constitute a second sensing unit, an insulating layer that covers the first sensor electrode on the substrate, and a cover that includes at least one hole through which the chemical particles pass, where the cover is located over the first and second sensor electrodes. The first sensing unit may sense a capacitance-change due to the chemical particles that pass through the hole and then adhere to the insulating layer that is located on the first sensor electrode. The second sensing unit may sense a resistance-change due to the chemical particles that pass through the hole and then adhere to the second sensor electrode.

In other exemplary embodiments, the environmental sensor may include a substrate, a first sensor electrode that is formed on the substrate to constitute a first sensing unit, a second sensor electrode that is formed on the substrate to constitute a second sensing unit, and a cover that includes at least one hole through which the chemical particles pass, where the cover is located over the first and second sensor electrodes. The first sensor electrode and the second sensor electrode may have different resistance-change characteristics. The first sensing unit may sense a first resistance-change due to the chemical particles that pass through the hole and then adhere to the first sensor electrode. The second sensing unit may sense a second resistance-change due to the chemical particles that pass through the hole and then adhere to the second sensor electrode.

In still other exemplary embodiments, the environmental sensor may include a substrate, a first sensor electrode that is formed on the substrate to constitute a first sensing unit, a second sensor electrode that is formed on the substrate to constitute a second sensing unit, an insulating layer that covers the first and second sensor electrodes on the substrate, and a cover that includes at least one hole through which the chemical particles pass, where the cover is located over the first and second sensor electrodes. The first sensor electrode and the second sensor electrode may have different capacitance-change characteristics. The first sensing unit may sense a first capacitance-change due to the chemical particles that pass through the hole and then adhere to the insulating layer that is located on the first sensor electrode. The second sensing unit may sense a second capacitance-change due to the chemical particles that pass through the hole and then adhere to the insulating layer that is located on the second sensor electrode. Since the environmental sensor is described above, duplicated description related thereto will not be repeated.

An environmental sensor constructed according to the principles of the invention may be integrated in a display device and in an electronic device that includes a display device. For example, an environmental sensor constructed according to the principles of the invention may be included in a cellular phone, a smart phone, a video phone, a smart pad, a smart watch, a tablet PC, a car navigation system, a television, a computer monitor, a laptop, a head mounted display device, and similar electronic devices.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. An environmental sensor for an electronic display device, comprising:
    a substrate;
    a first sensing unit having a first sensor electrode disposed on the substrate and a single wiring connected to the first sensor electrode;
    a second sensing unit having a second sensor electrode disposed on the substrate and two wirings connected to the second sensor electrode;
    an insulating layer covering the first sensor electrode; and
    a cover disposed over the first and second sensor electrodes, the cover including at least one hole through which chemical particles can pass,
    wherein the first sensing unit is configured to sense a capacitance-change due to the chemical particles that pass through the at least one hole and adhere to the insulating layer, and
    wherein the second sensing unit is configured to sense a resistance-change due to the chemical particles that pass through the at least one hole and adhere to the second sensor electrode.

2. An electronic display device having an integrated environmental sensor comprising the environmental sensor of claim 1 and a touch sensor electrode, wherein the substrate is a display panel substrate included in the display device, and the touch sensor electrode, the first sensor electrode, and the second sensor electrode are supported by the display panel substrate.

3. The electronic display device of claim 2, wherein an area of the first sensor electrode and an area of the second sensor electrode are smaller than an area of the touch sensor electrode.

4. The electronic display device of claim 2, further comprising:
    a sidewall located between the touch sensor electrode and the first and second sensor electrodes and configured to prevent the chemical particles from entering a region in which the touch sensor electrode is located.

5. The environmental sensor of claim 1, wherein the first sensing unit is configured to output a first sensing signal when sensing the capacitance-change, the second sensing unit is configured to output a second sensing signal when sensing the resistance-change, and different types of the chemical particles are identified according to whether the first sensing signal is output from the first sensing unit and whether the second sensing signal is output from the second sensing unit.

6. The environmental sensor of claim 5, wherein the first sensing unit is configured to react to a first type of chemical particles and a second type of chemical particles, and the second sensing unit is configured to react to the second type of chemical particles and a third type of chemical particles.

7. The environmental sensor of claim 6, wherein the chemical particles are determined as the first type of chemical particles when only the first sensing signal is output, the chemical particles are determined as the third type of chemical particles when only the second sensing signal is output, the chemical particles are determined as the second type of chemical particles when the first sensing signal and the second sensing signal are output, and it is determined that the chemical particles do not exist when neither the first sensing signal nor the second sensing signal is output.

8. An electronic display device, comprising:
- a display panel including a display panel substrate;
- a first sensing unit having a first sensor electrode disposed on the display panel substrate and a single wiring connected to the first sensor electrode;
- a second sensing unit having a second sensor electrode disposed on the display panel substrate and two wirings connected to the second sensor electrode;
- a cover disposed over the first and second sensor electrodes, the cover including at least one hole through which chemical particles can pass,
- wherein the first sensing unit is configured to sense a capacitance-change at a region corresponding to the first sensor electrode, and
- wherein the second sensing unit is configured to sense a resistance-change at a region corresponding to the second sensor electrode.

9. The electronic display device of claim 8, wherein the first sensing unit is configured to react to a first type of chemical particles and a second type of chemical particles, and the second sensing unit is configured to react to the second type of chemical particles and a third type of chemical particles.

10. The electronic display device of claim 9, wherein the chemical particles are determined as the first type of chemical particles when only the first sensing signal is output, the chemical particles are determined as the third type of chemical particles when only the second sensing signal is output, the chemical particles are determined as the second type of chemical particles when the first sensing signal and the second sensing signal are output, and it is determined that the chemical particles do not exist when neither the first sensing signal nor the second sensing signal is output.

11. The electronic display device of claim 8, wherein the display panel further includes:
- a touch sensing unit having a touch sensor electrode disposed on the display panel substrate; and
- a sidewall located between the touch sensor electrode and the first and second sensor electrodes and configured to prevent the chemical particles from entering a region in which the touch sensor electrode is located.

12. The electronic display device of claim 11, further comprising:
- a sensing controller configured to provide a first sensing control signal to the touch sensing unit to control the touch sensing unit and configured to provide a second sensing control signal to the first and second sensing units to control the first and second sensing units,
- wherein the sensing controller detects a user's touch input based on first sensing data generated by the touch sensing unit in response to the first sensing control signal and detects the chemical particles that exist in an air based on second sensing data generated by the first and second sensing units in response to the second sensing control signal.

* * * * *